US008086867B2

(12) United States Patent
Freeman et al.

(10) Patent No.: US 8,086,867 B2
(45) Date of Patent: Dec. 27, 2011

(54) SECURE IDENTITY AND PRIVILEGE SYSTEM

(75) Inventors: William E. Freeman, Arbutus, MD (US); Mark A. Bellmore, Mt. Airy, MD (US); Kenneth W. Aull, Fair Fax, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1420 days.

(21) Appl. No.: 10/137,622

(22) Filed: May 1, 2002

(65) Prior Publication Data

US 2004/0162984 A1 Aug. 19, 2004

Related U.S. Application Data

(60) Provisional application No. 60/367,260, filed on Mar. 26, 2002.

(51) Int. Cl.
*G06F 21/00* (2006.01)
*H04L 9/32* (2006.01)
*H04L 9/00* (2006.01)
*H04L 9/28* (2006.01)

(52) U.S. Cl. ........ 713/186; 713/156; 713/157; 713/175; 713/185; 713/182; 380/28; 726/5; 726/2; 726/3; 726/4

(58) Field of Classification Search .................. None
See application file for complete search history.

(56) References Cited

U.S. PATENT DOCUMENTS

| 3,636,318 | A |   | 1/1972 | Lindstrom |         |
|-----------|---|---|--------|-----------|---------|
| 4,993,068 | A |   | 2/1991 | Piosenka  |         |
| 4,995,081 | A |   | 2/1991 | Leighton  |         |
| 5,337,358 | A |   | 8/1994 | Axelrod   |         |
| 5,337,360 | A | * | 8/1994 | Fischer   | 713/176 |
| 5,420,924 | A |   | 5/1995 | Berson    |         |
| 5,436,972 | A | * | 7/1995 | Fischer   | 380/286 |

(Continued)

FOREIGN PATENT DOCUMENTS

WO      WO 01 40982      6/2001

OTHER PUBLICATIONS

Pavlidis, Theo. "A New Paper/Computer Interface: Two-Dimensional Symbologies". 15th International Conference on Pattern Recognition. vol. 2. Pub. Date: 2000. Relevant pp. 145-151. Found on the World Wide Web at: http://ieeexplore.ieee.org/stamp/stamp.jsp?tp=&arnumber=906036.*

*Primary Examiner* — Syed A. Zia
*Assistant Examiner* — Jeremiah Avery
(74) *Attorney, Agent, or Firm* — Tarolli, Sundheim, Covell & Tummino LLP

(57) ABSTRACT

A process for generating a unique, secure and printable identity document, for authenticating the use of the document, and for granting privileges based on the document, includes generating an identity certificate for an individual. This certificate incorporates a pointer to biometric and other identifying data for the individual which are stored in a reference database. The identity certificate is encoded to produce, for example, a machine-readable printable 2-dimensional barcode as an identity document. The identity document may then be used by the document holder for generation of an encoded privilege document and this, in turn, is compared with the stored reference data, including the stored biometric when the privilege is to be exercised.

28 Claims, 4 Drawing Sheets

U.S. PATENT DOCUMENTS

| | | |
|---|---|---|
| 5,457,747 A | 10/1995 | Drexler |
| 5,657,389 A | 8/1997 | Houvener |
| 5,659,616 A * | 8/1997 | Sudia ............................ 705/76 |
| 5,668,874 A | 9/1997 | Kristol |
| 5,673,320 A | 9/1997 | Ray |
| 5,712,914 A | 1/1998 | Aucsmith et al. |
| 5,742,685 A | 4/1998 | Berson |
| 5,748,807 A * | 5/1998 | Lopresti et al. ............... 382/310 |
| 5,764,789 A | 6/1998 | Pare, Jr. |
| 5,774,552 A * | 6/1998 | Grimmer ...................... 713/156 |
| 5,787,186 A | 7/1998 | Schroeder |
| 5,790,674 A | 8/1998 | Houvener |
| 5,799,092 A | 8/1998 | Kristol |
| 5,805,719 A | 9/1998 | Pare, Jr. |
| 5,838,812 A | 11/1998 | Pare, Jr. |
| 5,864,622 A | 1/1999 | Marcus |
| 5,892,904 A * | 4/1999 | Atkinson et al. ............... 726/22 |
| 5,973,731 A | 10/1999 | Schwab |
| 5,987,153 A | 11/1999 | Chan |
| 6,016,476 A | 1/2000 | Maes |
| 6,016,480 A | 1/2000 | Houvener |
| 6,035,398 A * | 3/2000 | Bjorn ............................ 713/186 |
| 6,072,894 A | 6/2000 | Payne |
| 6,104,809 A | 8/2000 | Berson |
| 6,122,403 A | 9/2000 | Rhoads |
| 6,137,895 A | 10/2000 | Al-Sheikh |
| 6,141,423 A * | 10/2000 | Fischer ......................... 380/286 |
| 6,167,517 A | 12/2000 | Gilchrist |
| 6,202,151 B1 | 3/2001 | Musgrave |
| 6,237,096 B1 * | 5/2001 | Bisbee et al. .................. 713/178 |
| 6,263,438 B1 * | 7/2001 | Walker et al. ................. 713/178 |
| 6,292,092 B1 | 9/2001 | Chow |
| 6,310,966 B1 | 10/2001 | Dulude et al. |
| 6,311,272 B1 | 10/2001 | Gressel |
| 6,317,834 B1 | 11/2001 | Gennaro |
| 6,320,974 B1 | 11/2001 | Glaze |
| 6,345,104 B1 | 2/2002 | Rhoads |
| 6,430,688 B1 * | 8/2002 | Kohl et al. .................... 713/156 |
| 6,505,193 B1 * | 1/2003 | Musgrave et al. ................. 707/3 |
| 6,934,861 B2 * | 8/2005 | Haala ............................... 726/5 |
| 6,938,157 B2 * | 8/2005 | Kaplan ......................... 713/176 |
| 7,062,651 B1 * | 6/2006 | Lapstun et al. ............... 713/168 |
| 7,181,441 B2 * | 2/2007 | Mandato et al. .................. 707/3 |
| 7,325,141 B2 * | 1/2008 | Chow et al. ................... 713/183 |
| 7,464,162 B2 * | 12/2008 | Chan ............................. 709/225 |
| 2001/0010730 A1 | 8/2001 | Rhoads |
| 2002/0010679 A1 * | 1/2002 | Felsher .......................... 705/51 |
| 2002/0023220 A1 * | 2/2002 | Kaplan ......................... 713/176 |

* cited by examiner

SECURE IDENTITY AND PRIVILEGE SYSTEM

This application claims the benefit of U.S. Provisional Application No. 60/367,260, filed Mar. 26, 2002, the disclosure of which is hereby incorporated herein by reference.

BACKGROUND OF THE INVENTION

The present invention relates, in general, to a process for authentication and protection of identity, and to a method for granting privileges based on that protected identity. More particularly, the invention is directed to a process for authenticating and protecting identity simply, and with high reliability, wherein the cost of granting such high reliability privileges is greatly reduced.

Positive identity verification has become critical in a wide range of applications involving public safety and security. In addition, it has become more and more important to provide secure personal identification of individuals to support the proper granting of privileges such as, for example, driver's licenses, travel documents, commercial transactions, access to various locations or information, and the like. Sophisticated techniques for generating and protecting documents such as passports, driver's license cards and the like, and for the granting of various privileges have been developed, such techniques relying on signatures, fingerprints, images of faces, PIN numbers, and similar identifiers, in attempts to avoid counterfeiting or illegal modifications which can lead to misrepresentation of an individual or improper granting of privileges and can result in fraudulent transactions and breaches of security. With recent heightened security concerns throughout the world, the need to protect against identity and privilege theft and the need to ensure accurate and reliable identification of individuals has become paramount.

One approach to providing secure identification of individuals or documents has been to detect security information on a document itself or on accompanying identifying material and to determine whether that information has been altered in any way. An example of such a prior system is found in typical credit, debit and charge cards that utilize holographic images, the encoding of cardholder information on magnetic strips on the card, a requirement to obtain validation for transaction approval, and/or signature verification. Laminating techniques, invisible inks, embedded magnetic and RF detectable tags, and embedded microminiature smart chips have all been used to provide additional protection. However, a deficiency of all of these systems is that they rely on information encoded on the card or document being presented, and although they may incorporate sophisticated encryption, the fact that such cards or documents are in the possession of the individual presenting them means that they are susceptible to modification, contamination, duplication or counterfeit. Any time a potential counterfeiter has access to a verification medium, the potential exists for corruption of the medium, no matter how sophisticated the level of security.

A significant failure in the securing of identity has been the confusion between identity and privilege. For example, a driver's license incorporates both an identity and the privilege to drive. The focus of a Department of Motor Vehicles is to ensure that a person has adequate training, vision and skills to operate a motor vehicle; their focus is only secondarily on identity. In some jurisdictions the only proof of identity needed might be as informal as a water bill. Yet a driver's license is often used for proof of identity, and is all that is required to be granted many privileges. Separation of the process and responsibilities for establishing identity from the process and responsibilities of granting a privilege is essential. If an identity is created and maintained separately from privilege, issues such as the loss of identity when a driver's license is impounded can be avoided.

A recent technique for authenticating transactions is the use of a digital certificate, such as that defined by the X.509 and the ANSI X.9 standards, which allows users to authenticate electronic documents and electronic transactions through the use of cryptographic techniques, including public key cryptography. Such certificates may be generated, for example, by combining a public key with a data set that may include an identification field that is unique to the individual or entity possessing a corresponding private key. Other fields in the data set may include such things as a serial number, the name of the issuer, a validity period, a subject name, or the like, as well as indicators of privileges and attributes that go with the document. The digital certificate may then be processed using a conventional hash function to generate a hash value that is then signed, or encrypted, using the private key of the user, to generate a digital signature. The digital signature is then appended to the certificate. The X.509 and the ANSI X.9 standards incorporate a hash function that generates a unique digital signature from a given data set, and require that such a signed certificate could only have been signed by a trusted Certification Authority (CA).

Such digital certificates, although of value in authenticating electronic transactions, fail to authenticate a human transacter, for they only authenticate the possession of the private cryptographic key used in the transaction. Since private keys are physically stored on computers or electronic storage devices, they are not physically related to the entities associated with the keys, but instead may be assigned to a group or organization. Private keys are subject to physical loss, theft, or destruction, since they must be stored on physical media in untrusted locations, and the locking mechanism protecting such keys can be forgotten. Private keys are, therefore, the Achilles' heel of digital certificates.

Another technique for authenticating documents for proving identities is the use of biometric(s) information such as fingerprints, voice prints, photographs, eye prints or the like that, in the past, have been recorded on passports or other documents and which can be compared to information stored in a database when the bearer of the document wishes to prove identity or seeks a privilege. Such biometric(s) information has been encrypted and stored in two-dimensional barcodes on identity documents, and document readers have been used to verify whether that information properly identifies the person carrying or presenting the document. In addition, photographs on documents such as passports can automatically be compared with photographs in a "watch list", using matching algorithms, for example, to confirm the identity of an individual bearer. Thus, for example, in such a system biometric data is prestored in a database. Subsequent transactions utilize biometric data generated from the physical characteristics of the current user, which is then appended to a document or other authenticating product, and which may then be used to authenticate the user by comparison against the prestored biometric data at a later time. It is also common to centralize the comparison of biometrics, so that a comparison is achieved by forwarding biometric features from a point of privilege (POP) to the central database where the comparison is to be made. However, these systems have not dealt with the problem of biometric substitution or corruption in the operation of a central database. These systems also do not have the flexibility to provide different levels of assurance by providing multiple algorithms based on the value of the privilege. Such flexibility can only be achieved by moving the biometric comparison from the central database out to the point of privilege.

Although prior technology has improved significantly, problems still exist, for currently there are no means for securely binding a granted privilege or authorization with a person's identity, using a printed document. One example of such a printed document would be the use of printed itineraries at airports that are used to grant individuals access to the airline terminal. There is no method available for the airport to know that the information, including flight information, on the itinerary is authentic, nor is there any mechanism for authenticating the identity of the person holding the document, for, as noted above, the fact that the individual is carrying the document means that it is susceptible of tampering.

A second example is the granting of a license such as a driver's license. An individual must appear in person to have some biometric information, such as their photograph or fingerprint, physically included on the license document, and tamper resistant techniques are used to protect the physical license. However, collecting such biometrics does not in and of itself provide any proof of identity, and such documents, which are in the possession of the user, do not provide authentication, because such documents can be generated by non-authorized sources. For example, it is possible for an individual to obtain a driver's license either from multiple states or several licenses from the same state, all with different identities. Documents such as passports, social security cards, credit cards and the like are all susceptible of counterfeiting since there is no absolute tie between the document and the person seeking to use the document.

SUMMARY OF THE INVENTION

The present invention is directed to a procedure for securely binding a person's identity and reference biometric(s) on an encoded identity record. Although in the preferred form of the invention the identity record is a printable (or printed) document, it will be understood that the record may take various forms, such as cards containing memory chips or having other permanent memory storage capabilities, and which have the capacity to store the data required for the present invention. For convenience, however, the identity record will be referred to herein as an identity record or as a printable identity document. This identity record can be used to create a derivative printed identity document that binds the person's identity to reference biometric(s) and to a set of privileges authorized by the owner of the privileges.

In accordance with the invention, a person who wishes to utilize a security system incorporating the procedure of the present invention must first provide a provable, unique identity, and then must submit suitable biometric information, such as a digital photograph, an iris or retina scan, or other unique physical identifier, to create an identity certificate and referenced biometrics for storage in a remote, secure and trusted location. This remote location may be, for example, a computer database maintained by an identity-authenticating agency, organization, or approved individual, hereinafter referred to as a Trusted Identity Authority or TIA, having a secure data storage facility. This database is permanent, but preferably is updated periodically to ensure that an authenticating party who uses the database has accurate and reliable information.

A primary feature of this invention is that since identities are initially established by trusted identity authorities (TIAs) and privileges are later established by Trusted Privilege Authorities (TPAs), there is no need to issue public and private keys to the recipient of either an identity or a privilege. The entire focus of creating the initial identity is to provide a correct binding between an individual's identity and the individual's biometric(s) collected and stored during the process. The identity of a requesting individual must be established to the satisfaction of the TIA; i.e., the person must be shown to exist (the person was borne and has not died), and there must be proof that the individual presenting himself to the TIA is in fact that person. Fortunately, many commercial and government databases exist that simplify the issues involved in this correlation. Once the identity of an individual is established, then that identity is no longer available to others for future claims, as might happen during attempted identity theft.

When the identity vetting process has been completed, an identity certificate and associated biometric(s) are created and permanently stored in a TIA database, and the certificate is encoded by a machine-readable barcode to produce an identity record, such as a printable identity document that may be printed for attachment to any existing identity document, or that may be otherwise conveyed to the requesting individual. The identity certificate is a cryptographically secure certificate such as an X.509 certificate, which includes identifying data relating to the requesting individual, and thus may incorporate by reference biometric(s) data such as a photograph, iris scan, fingerprint or the like, identifying text material such as the requester's name and address, birthday, an identification number such as a Social Security number, and any other data the TIA may require. The identification number may serve as a pointer to a certificate that has been stored after creation of the identity certificate. The identity certificate also includes a cryptographic hash of the data, as well as an encrypted signature provided by the TIA so that the stored identity certificate incorporates multiple levels of security.

When an individual whose identity certificate has been stored in the TIA database wishes to request a privilege, such as a driver's license, passport, an airline travel itinerary, or the like, the individual presents the request to a Trusted Privilege Authority (TPA), who may be an agent for the TIA, for example, and who has access to the TIA database. After validating the individual's right to the privilege, the TPA retrieves the individual's identity certificate and associated biometric(s), and creates a new certificate that binds the retrieved identity and biometric(s) to the privilege being granted. The privilege certificate is then stored in a secure TPA database and is encoded to provide a printable, machine-readable two-dimensional barcode that may be printed on a privilege document or otherwise conveyed to the requester. In addition, the privilege granter (TPA) can send the privilege certificate and associated biometric(s) from its own database to satellite computers at sites where the privilege is to be granted. An example of this would be to send the privilege certificate and biometric(s) for all persons who are to leave from a certain airport to a satellite ticket counter computer at the airport itself.

The privilege document may be, for example, a printed airline flight itinerary containing a two-dimensional barcode, or may be a barcode printed and attached to an identification document such as a passport or the like. The privilege document may be conveyed to the person who has requested it (the document holder) either directly, or by facsimile, mail, e-mail, or other transmission medium that will transmit the two-dimensional barcode accurately and reliably. Most privilege documents created in this way can be e-mailed to a recipient, and printed on a home computer printer, or the user may simply pick up the document at the point of privilege, e.g., by getting a ticket at an airline ticket counter, with the barcode embedded in the ticket.

The document holder who wishes to use the document for purposes of proving identity and privilege may present the document to an individual (agent) at a Point of Privilege (POP) who may grant the privilege and authenticate the individual. In the previous example, the agent may be a check-in agent at an airline counter who receives the privilege document, in this case a flight itinerary which contains the two-dimensional machine readable barcode, from the holder. The check-in agent then verifies the document by scanning the barcode to extract the identity certificate information from the barcode, including the contained pointer to the biometric(s) information about the holder that is stored in the privilege database. The scanning of the barcode also retrieves information relating to the document in question, such as flight information and the included cryptographic hash of the biometric information.

The computer terminal at the receiving agent's location uses the information from the barcode to access the TPA data storage computer and to retrieve the stored biometric(s) information for display on the local computer terminal. The local computer then calculates the cryptographic hash of the retrieved data from the database computer and compares it with the hash retrieved from the barcode on the document. If the hash signatures are the same, the agent is assured that neither the retrieved information nor the barcode have been tampered with. The agent may then compare the retrieved biometrics(s) with the holder to make sure it is the person to whom the document was issued. If all of the checks are correct, then the ticketing agent is assured that the holder is the person to whom the document was issued and thus is the correct person. Since the biometric(s) data has been initially collected by the TIA and optionally augmented by the TPA, and forwarded to the agent's system, the comparison of the biometric(s) data will be in accordance with the standards set by the privilege being granted. For example, some privileges may be granted with only a visual comparison of a stored photograph with the document holder at the POP. Other agent systems may use automated biometric(s) comparison machinery available at the POP.

In accordance with the present invention, therefore, a set of biometrics is cryptographically bound to every identity certificate in a central, totally private, secure database, the data only being retrievable when the individual seeks to verify his identity, as in the process of requesting a privilege. The identity and the biometric(s) data at the central location can only be accessed by a licensed privilege owner in the process of granting the privilege requested by the individual owning that identity. The data at the central location is protected by a cryptographic hash contained within the certificate itself so that if data is tampered with at the remote site or in transit, verification will fail. Since the two-dimensional barcode is capable of encoding the information on an X.509 certificate, for example, which is protected by an unbreakable mathematical code, the present invention permits individual identification data to be printed or to be transmitted by facsimile or other electronic communication systems, for easy generation and transmission, and replacement if necessary, without compromising the integrity of the data or the security of proper identification. No private or public keys of any kind are required to be held by or for the person being granted an identity or a privilege. This greatly reduces the cost of the system compared to an equivalent Public Key Infrastructure.

As will be seen from the foregoing, the invention provides a process for personal authentication that allows the grantors of privilege to easily and seamlessly add additional biometric(s) to enhance the security of their privileges without requiring all privilege grantors to adopt the same standards.

In addition, the invention provides a security system that produces identification and privilege records that contain no data that might be considered to be privacy sensitive or that is not a part of the public record, provides cheap (paper only), unforgeable documents that present no disposal risk, and provides a systemic way to detect tampering of a paper document in all cases, including detection of tampering of the biometric(s) stored in remote databases. Furthermore, the invention provides a process by which biometric(s) data can be prepositioned at an expected point of privilege in order to enable the system to function in case there is a network failure.

BRIEF DESCRIPTION OF THE DRAWINGS

The foregoing, and additional objects, features and advantages of the present invention will become apparent to those of skill in the art from the following detailed description of embodiments thereof, taken in conjunction with the accompanying drawings, in which.

DETAILED DESCRIPTION OF THE INVENTION

Figure 1:
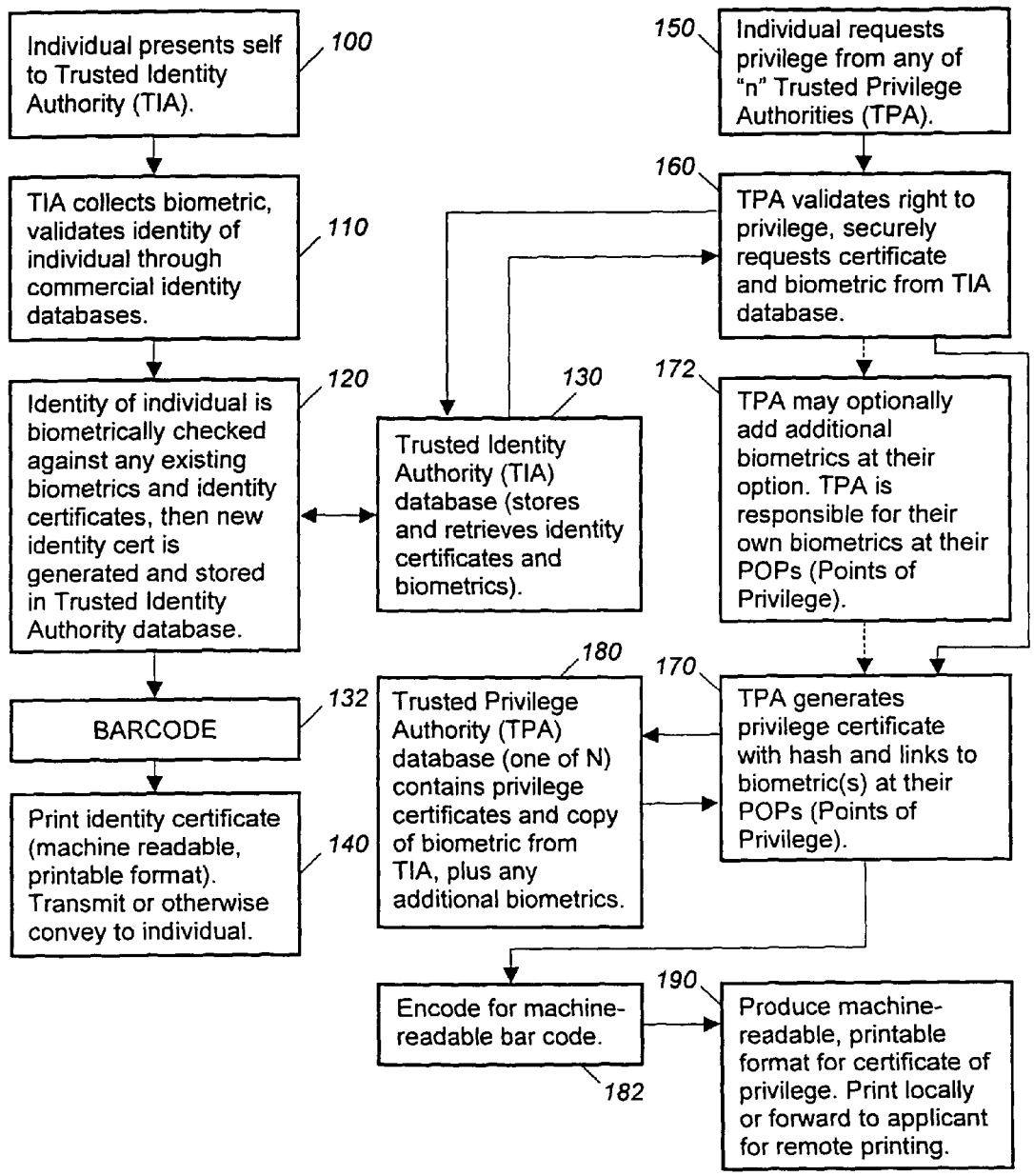
FIG. 1 is a flowchart illustrating the process of the present invention for establishing identity and the granting of privilege.

Turning now to a more detailed description of the secure identity and privilege system of the present invention, FIG. 1 is a block diagram illustrating a process for producing a record, preferably in a machine-readable format that may be printed as an identity document containing cryptographically secure information bound to a reliable proof-of-identity system. Although the system and process of the present invention are capable of a wide range of applications which require verification of documents and/or authentication of the bearer of a document, the invention will be described herein with reference to only two such applications for the purpose of illustrating the fundamental concepts.

The first application exemplifying the invention is a process for producing a record such as a printed identity document for identification of a bearer. This basic document asserts no privilege, but it provides a mechanism to enable the second application, which is a process for producing a printed document for identification of the bearer and for granting a privilege; for example, a passport, driver's license, an airline ticket, a credit card, or the like. It will be understood that the process of the invention utilizes conventional, off-the-shelf equipment, but that the equipment is used in a unique manner to produce the secure system of the present invention.

Figure 3:
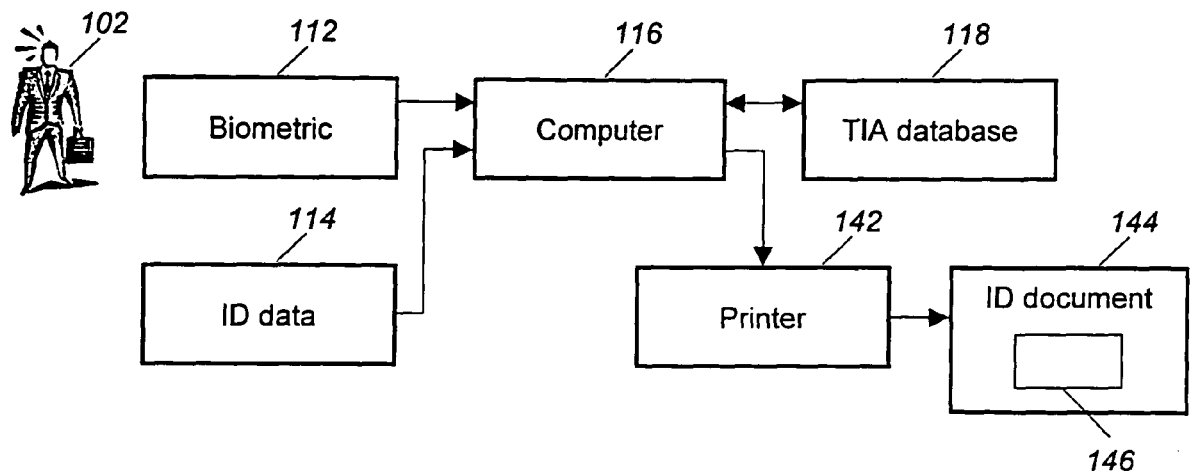
FIG. 3 is a block diagram of a system for carrying out the identity process of FIG. 1.

The first step in the process is illustrated in block 100 of FIG. 1, wherein the system is initiated at a Trusted Identity Authority (TIA) by an individual (102 of FIG. 3) who requests a database identity entry in order to participate in the security system of the present invention. In the step illustrated in block 110, the requesting individual's identity is established with the trusted authority, which may be, for example, a company, a group, a government agency, or an individual.

The trusted authority provides and maintains as part of the security system a controlled, permanent reference database or repository for identifying data which is unique to each requesting individual, and which will respond to inquiries to provide that information for purposes of authenticating identity and for issuing privileges accurately to individuals participating in the system. Identifying information about an individual preferably includes biometric(s) data collected by commercially available equipment 112 of FIG. 3, as well as other identifying information, such as the requestor's name, address, date and place of birth, which can be obtained from and validated by the use of commercially available identity databases illustrated at 114. In a preferred form of the invention, the biometric data is a photograph, but may also, or alternatively, include fingerprints, footprints, iris scans, retina scans, DNA information, or the like.

The collected information is submitted to a TIA computer 116 that compares the received data with existing identity data in a TIA database 118. If the submitted identity is similar to existing identities, the submitted data is biometrically checked against the existing biometrics or identity certificates, as illustrated in block 120, to prevent identity theft. If the submitted identity is a renewal, or is authenticated, a "signature" is added to the assembled data, and a new digital identity certificate is generated (block 120) using, for example, the X.509 standard. The added signature preferably is in the form of a cryptographic "hash" which is derived from, and corresponds to, the assembled data. This signed cryptographic hash protects the integrity of the assembled data. The calculation of the hash is carried out using a standard hash function, to compute a number that uniquely represents the data. This number is then encrypted by the TIA to provide a signature. This data, along with the hash and the signature, make up an identity certificate that is unique to the requesting individual.

The unique identity certificate is then stored in a Trusted Identity Authority database (130), which may be the secure computer 118, to provide a permanent source of validated identity certificates. This identity and associated biometric(s) are stored, as indicated at block 120, in a Trusted Identity Authority database (130), which may be a secure computer, to provide a permanent source of validated biometrics and identity certificates. This stored information preferably is renewed periodically by the individual so as to ensure that it is up-to-date, but the storage repository is controlled by the trusted identity authority to permit the authority to regulate the use of the system. For example, the authority may decide that access to the stored data will automatically expire after a fixed period of time, or the authority can revoke a stored certificate upon occurrence of a predetermined event such as the death of the individual. The trusted identity authority may use revocation of the X.509 identity certificate to denote the death or theft of the identity of any individual, since the identity certificate must be validated on each use by remote checking of revocation status. After generation of the identity certificate (block 120), the certificate may be encoded (block 132) to produce a machine readable, printable, two dimensional identity barcode (block 132). The barcode may be stored to provide an identity record, or may be printed (block 140), as by a printer 142 (FIG. 3), to produce an identity document 144 that carries a printed barcode 146. This document helps establish identity without the manual entry of identity information when a privilege is requested.

Figure 4:
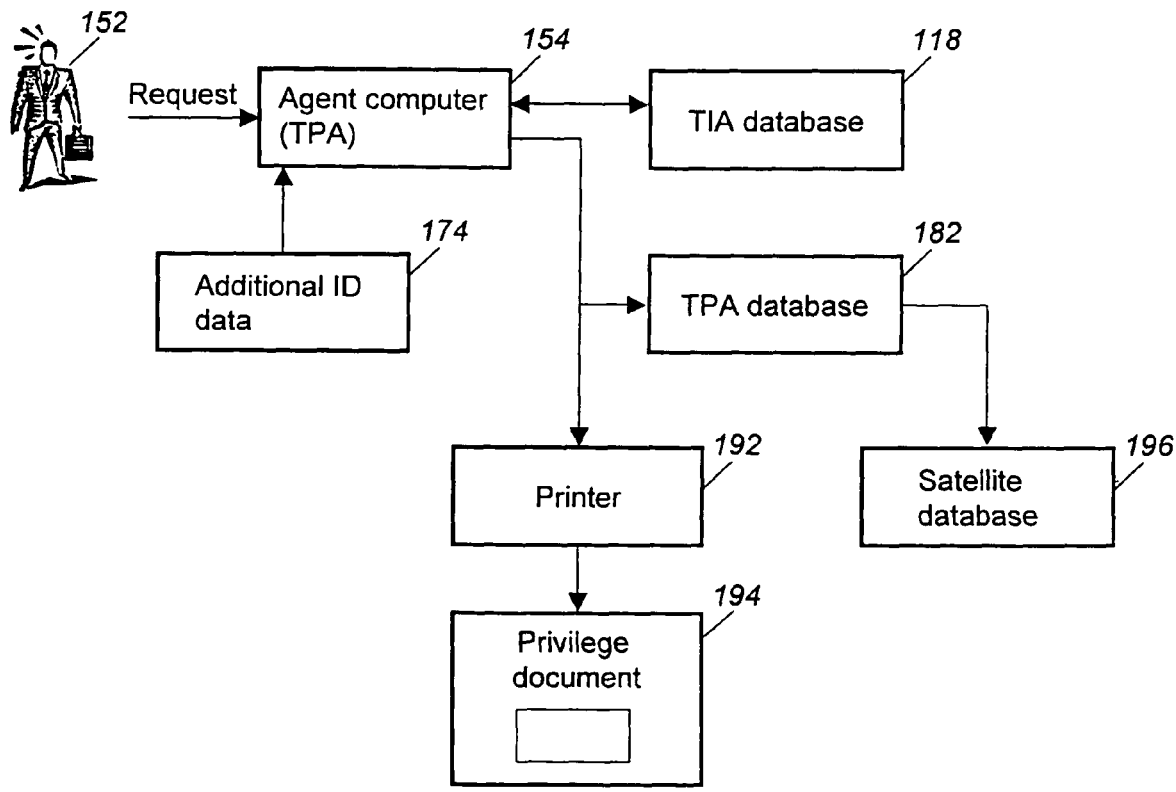
FIG. 4 is a block diagram of a system for carrying out the privilege granting process of FIG. 1.

The next step of the process, illustrated at block 150, occurs when a requester 152 (FIG. 4), who professes to be the individual who is participating in the system, requests a privilege from any agent or representative of any Trusted Privilege Authority authorized by the Trusted Identity Authority. In this situation, the identity of the requester would have to be established to the satisfaction of the TPA before the privilege, which, for example, may be the granting of a passport or the purchase of airline tickets, will be granted. The request is presented to the agent or representative (Trusted Privilege Authority, or TPA), who has access to the TIA database through the agent's local computer 154 (FIG. 4). Thus, for example, if the trusted identity authority (TIA) is a government agency such as the Federal Aviation Administration, the agent (TPA) might be a travel agent authorized to use the database 118 that is provided by the FAA in preparing airline tickets for the requesting individual. In another example, the trusted identity authority could be a corporation, in which case the agent might be an employee of the corporation who might be charged with providing access to secure locations for qualified the individuals. Other examples will be apparent to those of skill in the art.

Before granting a requested privilege, the TPA agent must validate the requester's right to the privilege, as shown in block 160. To do this, the agent securely obtains the requester's identity certificate with its included biometrics, from the TIA database (block 130) and computer 118. When this is retrieved and the identity of the requester is verified to the satisfaction of the agent, the agent, on behalf of the TPA, grants the requested privilege, as indicated at block 170. The verification of identity may, for example, be a comparison of the biometric(s), such as a photograph, received from the TIA database with the requester.

If desired, the trusted privilege authority may require identifying or other information in addition to the data provided by the retrieved identity certificate, to allow it to enforce more stringent identity checks, as shown in block 172. In this case, a TPA or its agents would be responsible for requiring a requester to produce additional biometric(s) or other identifying data (174 in FIG. 4) at a given location, or Point of Privilege (POP), thereby allowing any desired level of security at the given location. When this additional level is satisfied, the privilege is granted, as illustrated at block 170, and the TPA produces a cryptographically secure privilege certificate, which is encrypted using the X.509 standard. This privilege certificate is stored (block 180) in a trusted privilege authority (TPA) database contained in a TPA computer 182 (FIG. 4), and incorporates information identifying the granted individual as well as information relating to the requested privilege. For example, if the agent were producing a travel itinerary for the requesting individual, the privilege certificate would include the travel information as well as a reference to the identity certificate that was retrieved from the TIA database and would incorporate a pointer to the stored data, including the encrypted signature, biometric(s) data, and any other data that might be included in the storage location of block 180. Each Trusted Privilege Authority may maintain one or more TPA databases as shown in block 180.

The integrity of the data included in the privilege certificate generated in block 170 is provided by including in the certificate a signed digital hash of the data and by encoding the privilege certificate into a machine-readable, two-dimensional bar code, as indicated at box 182, and by storing this record, as by inserting the bar code onto a document or other permanent retrievable record. In the example, the completed privilege document may be a travel itinerary that is then conveyed to the requester, as illustrated at block 190, as by supplying the privilege document to a printer 192 (FIG. 4), where it is printed out for the requesting individual to produce a privilege document 194, or by transmitting it to the individual for remote printing.

In accordance with a preferred form of the invention, the system can be used to deliver privilege data stored in the TPA database 182 to satellite computers 196 located where a privilege is to be granted. This can be done, for example, by dividing the database up physically so that the data can be stored at the location where it is to be used. The privilege data might include aircraft flight privileges which could be physically stored in satellite computers at each airport that will be granting boarding rights based on the privilege document.

Figure 2:
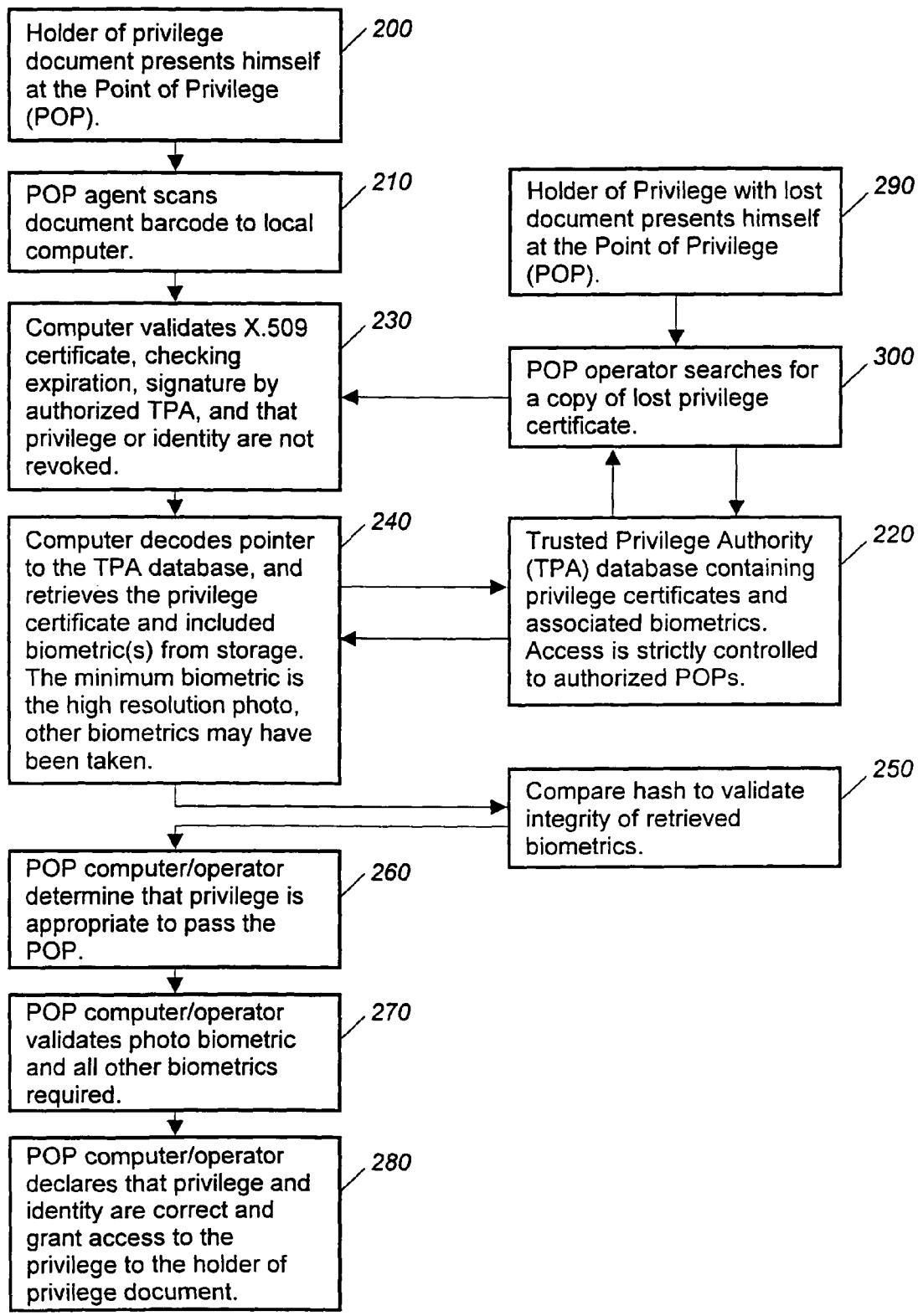
FIG. 2 is a flowchart illustrating the process of the present invention in the exercise of a privilege by an individual.
Figure 5:
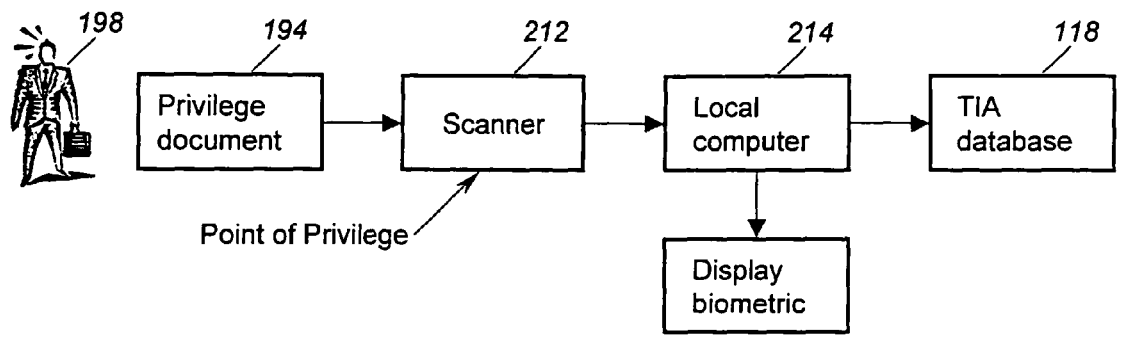
FIG. 5 is a block diagram of a system for carrying out the process of FIG. 2.

To use a privilege certificate, an individual 198 (FIG. 5) holding a record, or document 194 containing an encoded certificate presents the document to a point of privilege (POP). When the document is presented for use in identification, as in the case of a passport, or is presented to exercise a granted privilege, as when a travel document is presented to the point of privilege (POP) such as an airline ticket counter, as illustrated at block 200 in FIG. 2, a receiving agent scans the document barcode, as indicated at block 210, using a conventional barcode scanner 212 to store the privilege certificate data in the receiving agent's local computer system 214. The local computer system then extracts from the document the coded data contained in the barcode to obtain the information secured in the certificate. This information includes the data noted above, and includes a pointer or reference to the privilege certificate corresponding to individual to whom the certificate was issued and which was stored in the storage repository as indicated at block 180 in FIG. 1, or in the corresponding satellite computer 196 such as that described above and illustrated in FIG. 2 at block 220.

The local computer 214 validates the privilege certificate extracted from the document, as indicated at block 230, by checking the information contained in the certificate for such things as an expiration date or an authorized signature by a trusted privilege authority (TPA), and checks the TPA database to see if any information has been received that would indicate that the privilege had been revoked. If the privilege certificate is validated, the local computer decodes the pointer to the TPA database, as illustrated in block 240, to recover the privilege certificate and any other data stored in accordance with the process described with respect to block 180 in FIG. 1. This data may be retrieved from the original TPA database 182, or from a satellite computer 196 at the point where the privilege is to be granted (POP).

The referenced information, including the incorporated biometric(s) data, is retrieved from the database of block 220, as described in block 240, to provide at the local computer 214 the biometrics previously stored when the privilege certificate was granted. The local computer then recalculates the cryptographic hash of the retrieved biometric(s) and validates its integrity by comparing it to the hash incorporated in the document (block 250). If the recalculated cryptographic hash matches the hash included in the document barcode, the retrieved data is validated. If it does not match, then either the data stored in the repository or the barcode on the document is not valid. If they match, the document is authenticated, as indicated at block 250.

The agent or computer operator then determines (block 260) whether the privilege to be granted is appropriate for the location, or point of privilege, where the document has been presented, and if so, the biometric(s) retrieved from the repository are compared with the holder who has presented the document, as indicated in block 270. If the comparison is positive, the holder is authenticated and, the privilege is granted to the holder, as indicated at block 280. If the comparison is negative, the privilege certificate was granted incorrectly, or the presenter is not the individual who requested the privilege, and access is denied. This comparison is done at the agent location (POP) to allow a wide variety of comparison techniques to be used, at the discretion of the privilege-granting agency. Since the biometric(s) is not compressed and stored on the barcode, the comparison may be made using the original high-resolution data, an advantage over systems which compress biometric(s) data and which typically fail to properly classify at rates that would deny boarding to at least one passenger per aircraft, for example. Also, in accordance with this invention, whenever the digital certificate is referenced, under the rules of X.509 certificate validation, the certificate must be remotely validated as not revoked (block 230). This provides the opportunity for the privilege granting authority to revoke a privilege, based on a violation of the rules of the authority.

It is important to note that the loss of a privilege document presents no difficulty to the holder, for the privilege system of this invention will always have a record of the privileges granted, such as tickets for the Super Bowl, or for a particular aircraft flight. In such a situation, the holder may present himself to the point of privilege without the documents, as indicated at block 290. The operator of a POP (block 300) may then query the satellite, Trusted Privilege Authority database (block 220) or the original database (block 180 of FIG. 1) to recover the lost privilege certificate. This privilege certificate can always be reprinted for the user, which would be particularly desirable if the holder will be passing through several points of privilege, as would occur at an airport. Alternatively, the certificate can be electronically recovered, the privilege and identity extracted and validated, the biometric(s) pointer(s) used to recover the biometric(s), the hash used to validate the biometric, and the biometric used to grant the privilege to the claimant of the privilege, as described above.

Although the invention has been described in terms of preferred embodiments, it will be apparent to those of skill in the art that numerous modifications may be made without departing from the true spirit and scope thereof, as set out in the following claims.

What is claimed is:

1. A process for generating a unique, secure printable identity document and for authenticating the use of the identity document, comprising:
   generating for an individual an identity certificate incorporating a pointer to biometric data and other identifying data for the individual, and including cryptographically hashed information and an encoded signature;
   storing said identity certificate and biometric in a reference database;
   performing a one-to-many biometric data search in a reference database to check said individual's biometric data against biometric data previously stored in said reference database to determine whether said individual has a pre-existing identity already stored in said reference database, and, if said individual's biometric data was not previously stored in said reference database,
   encoding said individual's identity certificate, wherein the encoding includes generating a barcode;
   producing a machine-readable encoded identity record incorporating said identity certificate; and
   authenticating the use of said identity record by comparing said encoded identity with said stored identity certificate to authenticate the individual holding said identity record.

2. The process of claim 1, wherein authenticating further includes detecting revocation of the identity certificate.

3. The process of claim 1, wherein producing a machine-readable encoded identity record includes printing said barcode for use by a holder in identity verification.

4. The process of claim 1, wherein comparing said encoded identity record with said stored identity certificate includes comparing encoded signatures.

5. The process of claim 4, wherein comparing said encoded identity record with said stored identity certificate includes comparing externally stored biometric data with biometric data available from a presenter of the identity record.

6. A process for generating a unique, secure printable privilege, comprising:
   generating for an individual an identity certificate incorporating a pointer to biometric data and other identifying data for the individual, and including cryptographically hashed information and an encoded signature;
   storing said identity certificate and biometric data in a reference database in a location remote from locations where identity data is to be retrieved;
   retrieving identity data for an individual, including an encoded signature, data for identity and pointers to biometric data gathered from the remotely stored identity certificate;
   generating for said individual a privilege certificate incorporating reference to said identity certificate, cryptographically hashed privilege information, a pointer to existing biometric data, and an encoded signature;
   storing said privilege certificate and associated biometric data in a secure privilege database;
   producing a machine-readable encoded printable privilege document incorporating said privilege certificate;
   upon request for the granting of a privilege, comparing said encoded printable privilege document with said stored privilege certificate to biometrically authenticate the individual holding said printable privilege document; and
   detecting any revocation of the privilege prior to the granting of the requested privilege.

7. The process of claim 6, wherein producing a machine-readable encoded printable privilege includes printing said privilege for use by a holder in privilege verification.

8. The process of claim 6, wherein producing a machine-readable encoded printable privilege includes generating a barcode.

9. The process of claim 8, wherein producing a machine-readable encoded printed privilege further includes printing said barcode for use by a holder in privilege verification.

10. The process of claim 6, wherein comparing said encoded printable privilege with said stored privilege includes comparing encoded signatures.

11. The process of claim 10, wherein comparing said encoded printed privilege with said stored privilege includes comparing stored biometric data with biometric data available from a presenter of the printed privilege.

12. The process of claim 6, further including:
   generating for said individual privilege certificate additional biometric data;
   storing said additional biometric data in said secure privilege database; and
   incorporating in said privilege certificate a pointer to said additional biometric data, whereby additional biometrics may be added to a privilege certificate to enhance security.

13. The process of claim 6, further including forwarding a copy of said stored privilege certificate and associated biometric data to a locality where said privilege is to be exercised for comparison at said locality with said privilege document.

14. The process of claim 6, further including comparing said privilege certificate on said privilege document with said stored privilege certificate to detect tampering.

15. A process for generating a unique, secure privilege, comprising:
   generating for an individual an identity certificate incorporating a pointer to biometric data and other identifying data for the individual, and including cryptographically hashed information and an encoded signature;
   storing said identity certificate and biometric data in a reference database in a location remote from locations where identity data is to be retrieved;
   retrieving identity data for an individual, including an encoded signature, data for identity and pointers to biometric data gathered from the remotely stored identity certificate;
   generating for said individual a privilege certificate incorporating reference to said identity certificate, cryptographically hashed privilege information, a pointer to existing biometric data, and an encoded signature;
   storing said privilege certificate and associated biometric in a secure privilege database;
   producing a machine-readable encoded privilege record incorporating said privilege certificate;
   upon request for the granting of a privilege, comparing said encoded privilege record with said stored privilege certificate to biometrically authenticate the individual holding said privilege record; and
   detecting any revocation of the privilege prior to the granting of the requested privilege.

16. The process of claim 15, wherein producing a machine-readable encoded privilege record includes producing a printed privilege document.

17. The process of claim 15, wherein producing a machine-readable encoded privilege record includes producing a machine readable certificate of privilege from said stored identity certificate and said stored privilege certificate for delivery to the individual when said individual presents himself and requests said privilege.

18. The process of claim 17, wherein said machine readable certificate of privilege is produced from said stored identity certificate and said stored privilege certificate and delivered to said individual when said individual presents himself at a point of privilege and requests said privilege and has lost his privilege document.

19. A scalable method for generating a certified identity from a remotely accessible certifying entity or trusted identity authority (TIA) for a plurality of individuals, comprising:
   (a) providing a secure data storage adapted to automatically receive, store and retrieve biometric data and identity information within the TIA;
   (b) identifying a minimum set of biometric data to be collected from each individual seeking a certified identity, wherein said biometric data comprises one or more unique physical identifiers and wherein said unique physical identifiers included in said minimum set comprise at least one identifier selected from a group including facial image feature data, iris scan data, retina scan data, voice print data, DNA data, footprint data or fingerprint data;
   (c) submitting to the TIA, for a first individual, pre-selected biometric data corresponding to said minimum set of biometric data;
   (d) submitting to the TIA, for said first individual, pre-selected identity information comprising name, date of birth and place of birth;

(e) performing a one-to-many biometric data search of said TIA data storage to check said first individual's biometric data against said biometric data in said TIA data storage to determine whether said first individual has a pre-existing identity already stored in said TIA data storage;

(f) if said first individual does not have a pre-existing identity already stored in said TIA data storage, meaning said first individual's biometric data is not already stored in said TIA data storage, then storing said first individual's biometric data with said first individual's identity information for future pre-existing identity checks;

(g) hashing said first individual's biometric data to allow detection of an unauthorized attempt to alter data stored in said TIA data storage;

(h) generating a digital certificate of identity for said first individual; said certificate being digitally signed by said TIA, said certificate of identity including (i) the first individual's pre-selected identity information including name, date and place of birth, and (ii) a web address, URL or location data for said pre-selected biometric data, and associated hashes, permitting verifiably correct remote access to said certificate of identity by authorized entities;

(i) storing said certificate of identity in a file in said TIA data storage, said file having a unique name; and (j) computing a hash code including said file's unique name, and storing said file with said hash code.

20. The method of claim 19, further comprising:
(k) printing said certificate of identity as a tangible, portable document.

21. The method of claim 19, wherein step (e) also includes determining whether said first individual's biometric data has been stored in said TIA data storage from a prior identity certificate generation process, and if so, designating a prior identity certificate for said first individual; the method further comprising:
(k) revoking said prior identity certificate for said first individual;
(l) hashing updated biometric data and saving said hashed updated biometric data for future checks;
(m) adding new alias, new birth date or new birth place information to said first individual's prior identity information to generate updated first individual identity information;
(n) creating a new identity certificate including all aliases ever stored, plus current location or URL information for biometric data; wherein the hash of biometric data is included to represent the file names of the biometric data;
(o) storing said new identity certificate for future use to issue privileges.

22. The method of claim 19, further comprising a scalable method for accessing certified identity data stored remotely in the trusted identity authority (TIA) for a plurality of individuals, comprising:
(k) providing a first trusted privilege authority (TPA) designated as an agent for the TIA;
(l) establishing a right of access for said first TPA to access identity certificates stored in said TIA's data storage; and
(m) wherein said identity certificates' identity information and biometric data can only be accessed in said first TPA by a licensed privilege owner in a process of granting a privilege to an individual owning the identity, and wherein no public or private keys are required from an individual seeking a privilege.

23. The method of claim 22, wherein any TIA supports an unlimited number of TPA, and wherein said TPAs depend on said TIA's identity certificates to generate a root identity and biometrics for an individual seeking to exercise a privilege.

24. The method of claim 22, further comprising the following additional method steps:
(n) receiving information on a first privilege seeking individual in the TPA;
(o) validating said first privilege seeking individual's access to a privilege controlled by the TPA, and, as an agent of the TIA, retrieving the individual's Identity Certificate and associated biometrics to the TPA, and, in response,
(p) generating a first privilege certificate that binds the retrieved identity and biometrics to the privilege for which access is to be granted, wherein said privilege certificate is stored in a secure TPA database.

25. The method of claim 24, wherein said TPA comprises, in addition to said minimum set of biometric data required by said TIA, collection of additional biometric data from said first privilege seeking individual.

26. The method of claim 25, wherein said collection of additional biometric data does not require (a) other TPAs or (b) the TIA to use or honor said additional biometric data.

27. The method of claim 24, wherein said TPA sends said first privilege certificate and associated biometrics from said first TPA database to one or more sites where said privilege is to be granted, thereby pre-positioning said first privilege seeking individual's privilege certificate and biometric data where said privilege certificate and biometric data will be used to grant access to said privilege.

28. The method of claim 24, further comprising:
(q) printing said privilege certificate as a tangible document.

* * * * *